United States Patent
Elliott et al.

(10) Patent No.: US 6,688,168 B1
(45) Date of Patent: Feb. 10, 2004

(54) METHOD FOR DETERMINING AXLE LOAD OF A MOVING VEHICLE

(75) Inventors: Joseph A. Elliott, Plymouth, MI (US); Bryan T. Fulmer, Byron, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/299,348

(22) Filed: Nov. 19, 2002

(51) Int. Cl.[7] .............................................. G01M 15/00
(52) U.S. Cl. ........................................ 73/146; 73/146.2
(58) Field of Search ................................ 73/146, 146.2; 340/442, 443, 466

(56) References Cited

U.S. PATENT DOCUMENTS 4,914,869 A * 4/1990 Bayonnet et al. ............. 451/5
5,569,848 A * 10/1996 Sharp ........................ 73/146.2
6,222,444 B1 * 4/2001 Wang ......................... 340/442
2003/0052774 * 3/2003 Latarnik et al. ............ 340/443

* cited by examiner

*Primary Examiner*—Edward Lefkowitz
*Assistant Examiner*—Andre Allen
(74) *Attorney, Agent, or Firm*—Scott A. McBain

(57) ABSTRACT

A method for determining the axle load on a rotating tire or the percentage axle load of a first axle of a moving vehicle. The relationship between the axle load on a test tire and the rolling radius of the test tire under a constant pressure is empirically determined, and optionally the relationship between the pressure of the test tire and the rolling radius of the test tire at a constant axle load is empirically determined. A measurement of the rotational speed of the rotating tire is taken, and optionally a measurement of the pressure of the rotating tire is taken using a pressure sensor. The axle load or percentage axle load is determined from the measurement (or optionally from the measurements) and from the relationship (or optionally from the relationships).

20 Claims, 4 Drawing Sheets

METHOD FOR DETERMINING AXLE LOAD OF A MOVING VEHICLE

TECHNICAL FIELD

The present invention relates generally to vehicles, and more particularly to a method for determining axle load of a vehicle.

BACKGROUND OF THE INVENTION

Conventional methods for determining axle load of a moving vehicle include determining the axle load on a tire through the use of vehicle ride height sensors located at each wheel. The vehicle height sensors are generally a part of a relatively-expensive controlled vehicle suspension system.

What is needed is an improved method for determining axle load of a moving vehicle.

SUMMARY OF THE INVENTION

A first method of the invention is for determining the axle load on a rotating tire of a moving vehicle and includes steps a) through e). Step a) includes empirically determining a first relationship between the pressure of a test tire and the rolling radius of the test tire at a constant axle load on the test tire, wherein the pressure is measured by a pressure sensor, and wherein the rolling radius is determined from the measured rotational speed of the test tire. Step b) includes empirically determining a second relationship between the axle load on the test tire and the rolling radius of the test tire at a constant pressure of the test tire, wherein the axle load is a measured axle load, and wherein the rolling radius is determined from the measured rotational speed of the test tire. Step c) includes, after steps a) and b), taking a measurement of the pressure of the rotating tire using a pressure sensor. Step d) includes, after steps a) and b), taking a measurement of the rotational speed of the rotating tire. Step e) includes determining the axle load on the rotating tire from the measurements of steps c) and d) and from the first and second relationships of steps a) and b).

A second method is for determining the percent axle load of a first axle of a moving vehicle having first and second axles and includes steps a) through e). Step a) includes empirically determining a first relationship between the pressure of a test tire and the rolling radius of the test tire at a constant axle load on the test tire, wherein the pressure is measured by a pressure sensor, and wherein the rolling radius is determined from the measured rotational speed of the test tire. Step b) includes empirically determining a second relationship between the axle load on the test tire and the rolling radius of the test tire at a constant pressure of the test tire, wherein the axle load is a measured axle load, and wherein the rolling radius is determined from the measured rotational speed of the test tire. Step c) includes, after steps a) and b), taking a measurement of the pressure of a first tire on the first axle using a pressure sensor and taking a measurement of the pressure of a second tire on the second axle using a pressure sensor. Step d) includes, after steps a) and b), taking a measurement of the rotational speed of the first tire and taking a measurement of the rotational speed of the second tire. Step e) includes determining the percent axle load of the first axle from the measurements of steps c) and d) and from the first and second relationships of steps a) and b).

A third method of the invention is for determining the axle load on a rotating tire of a moving vehicle and includes steps a) through c). Step a) includes empirically determining a relationship between the axle load on a test tire and the rolling radius of the test tire at a constant pressure of the test tire, wherein the axle load is a measured axle load, and wherein the rolling radius is determined from the measured rotational speed of the test tire. Step b) includes, after step a), taking a measurement of the rotational speed of the rotating tire. Step c) includes determining the axle load on the rotating tire from the measurement of step b) and from the relationship of step a).

A fourth method of the invention is for determining the percent axle load of a first axle of a moving vehicle having first and second axles and includes steps a) through c). Step a) includes empirically determining a relationship between the axle load on a test tire and the rolling radius of the test tire at a constant pressure of the test tire, wherein the axle load is a measured axle load, and wherein the rolling radius is determined from the measured rotational speed of the test tire. Step b) includes, after step a), taking a measurement of the rotational speed of a first tire on the first axle and taking a measurement of the rotational speed of a second tire on the second axle. Step c) includes determining the percent axle load on the first axle from the measurements of step b) and from the relationship of step a).

Several benefits and advantages are derived from one or more of the methods of the invention. Determining axle load from tire rotational speed measurements or from tire rotational speed and tire pressure measurements is less expensive than using a conventional and relatively-expensive vehicle ride height sensor located at a wheel. Having axle load information easily available allows such information to be used to control the vehicle as with conventional vehicle control systems employing, or adapted by using a method of the invention to employ, axle load inputs.

DESCRIPTION OF THE PREFERRED EMBODIMENT

Figure 1:
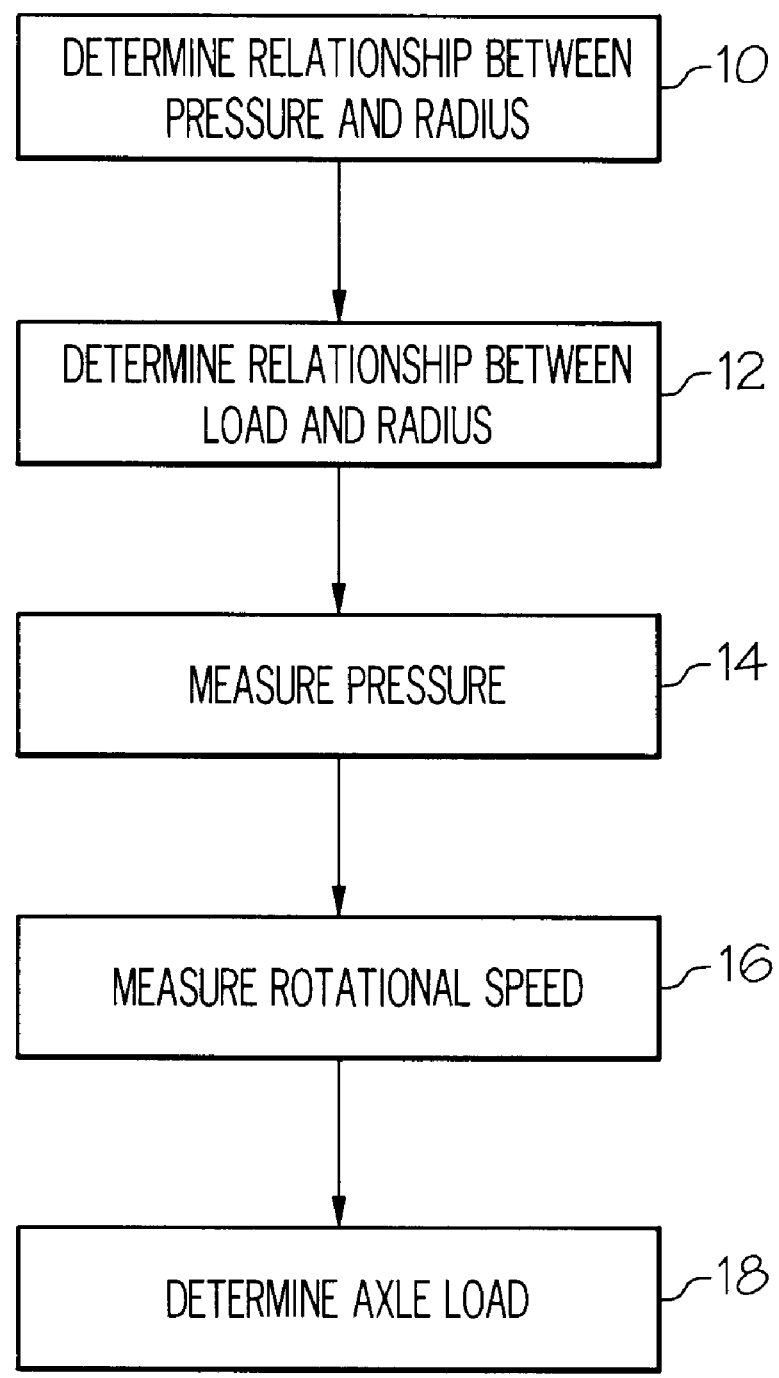
FIG. 1 is a block diagram of a method of the invention.

Referring now to the drawings, FIG. 1 shows a block diagram of a first method of the invention for determining the axle load on a rotating tire of a moving vehicle. The first method includes steps a) through e). Step a) is labeled as "Determine Relationship Between Pressure And Radius" in block 10 of FIG. 1. Step a) includes empirically determining a first relationship between the pressure of a test tire and the rolling radius of the test tire at a constant axle load on the test tire, wherein the pressure is measured by a pressure sensor, and wherein the rolling radius is determined from the measured rotational speed of the test tire. Step b) is labeled as "Determine Relationship Between Load And Radius" in block 12 of FIG. 1. Step b) includes empirically determining a second relationship between the axle load on the test tire and the rolling radius of the test tire at a constant pressure of the test tire, wherein the axle load is a measured axle load, and wherein the rolling radius is determined from the measured rotational speed of the test tire. Step c is labeled as "Measure Pressure" in block 14 of FIG. 1. Step c)

includes, after steps a) and b), taking a measurement of the pressure of the rotating tire using a pressure sensor. Step d) is labeled as "Measure Rotational Speed" in block 16 of FIG. 1. Step d) includes, after steps a) and b), taking a measurement of the rotational speed of the rotating tire. Step e) is labeled as "Determine Axle Load" in block 18 of FIG. 1. Step e) includes determining the axle load on the rotating tire from the measurements of steps c) and d) and from the first and second relationships of steps a) and b).

It is noted that the first and/or second relationship can be expressed in any manner such as, without limitation, a graph, a table, and/or an equation. It also is noted that when a first variable such as rolling radius (which is also expressed just as radius) is said to be determined from a second variable such as rotational speed, this means that the first variable is determined from using at least the second variable and is not limited to being determined only from using the second variable. In one instance, the rolling radius is determined by dividing vehicle speed by rotational speed, wherein vehicle speed is determined relative to a stationary road from radar or laser (or other) measurements from the moving vehicle to a stationary object or is determined relative to a "moving road" from the known radius and angular velocity of rotating rollers used to rotate the tires of a stationary vehicle such as those rotating rollers found at some auto emission check stations and in some vehicle test laboratories. In one embodiment of the first method, steps c) through e) are performed by a computer onboard the vehicle. In one variation, step e) includes approximating the first relationship with a first linear equation, approximating the second relationship with a second linear equation, and determining the axle load on the rotating tire from the measurements of steps c) and d) and from the first and second linear equations.

In one application, the first method also includes the step of controlling the vehicle based on the axle load determined in step e). In one vehicle-control example, determined axle load is used to allow more rear braking at heavier weights for dynamic rear brake proportioning. In another example, determined axle load is used for cornering-and-stability vehicle control. In an additional example, axle load is used by the vehicle power train to control power and torque delivery. In a further example, determined axle load is used for suspension-and-damping vehicle control. Other examples of controlling the vehicle based on determined axle load are left to the artisan.

Figure 2:
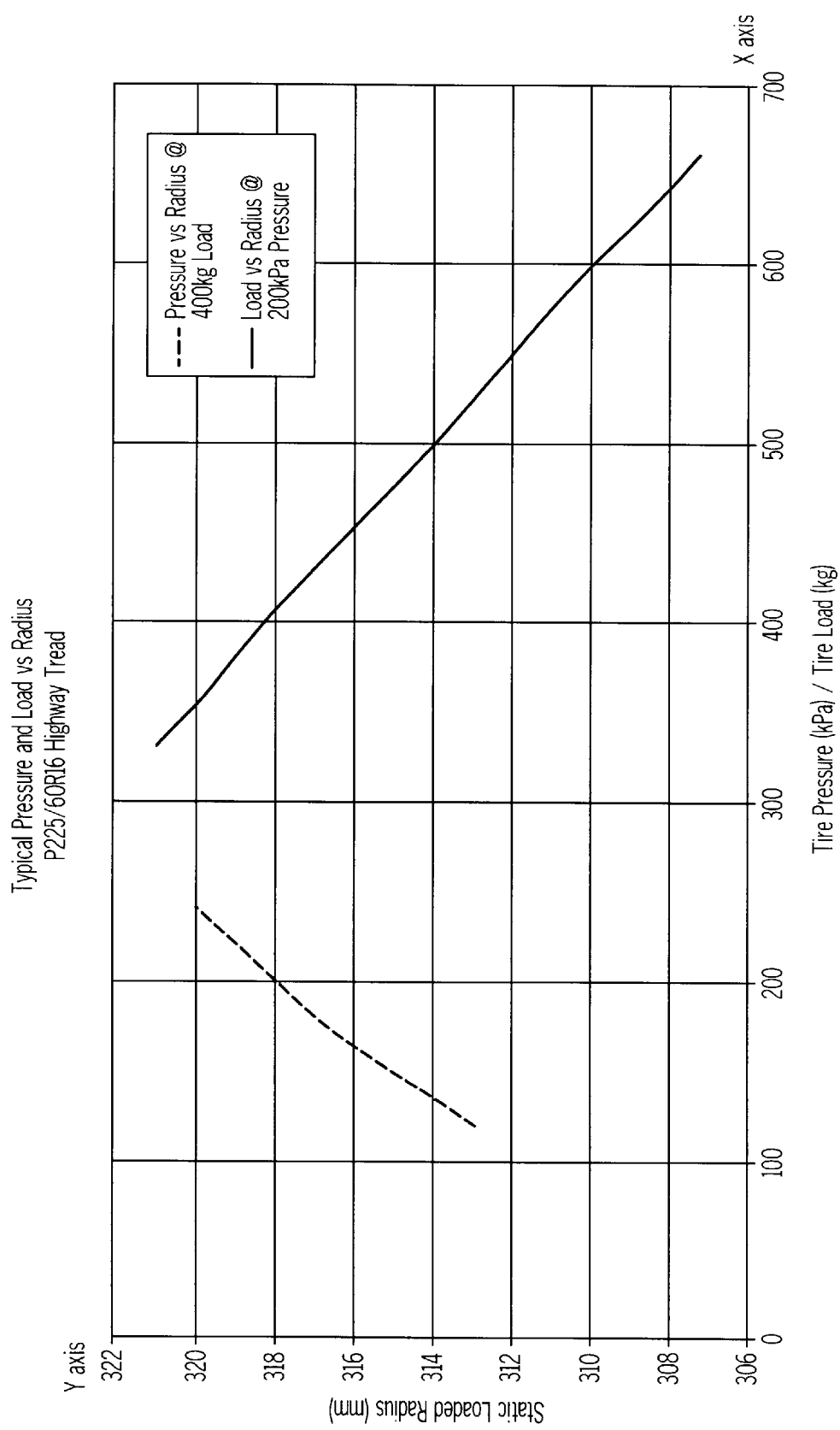
FIG. 2 is a graph of tire radius versus tire pressure and of tire radius versus tire load.

In a first illustration of the first method, step a) determines a first data set of rolling radius versus tire pressure at a constant load, and step b) determines a second data set of rolling radius versus load at a constant tire pressure. The first and second data sets are expressed as graphs in FIG. 2. In this illustration, step e) includes a first substep of performing a least squares linear fit of the two data sets to determine the slopes and the y-axis intercepts. Thus, for the two data sets:

$$\text{Radius}=m_1\times\text{Pressure}+b_1 \text{ (performed at constant load } C_1\text{), and}$$

$$\text{Radius}=m_2\times\text{Load}+b_2 \text{ (performed at constant pressure } C_2\text{),}$$

wherein m1 and m2 refer to the slopes of the two best fit lines, b1 and b2 refer to the y-axis intercepts of the two best fit lines, and for both sets of data, the y-axis intercepts are dependent on the constant pressure or load at which the data was collected. The best fit lines with the adjusted y-axis intercepts are:

$$\text{Radius}=m_1\times\text{Pressure}+b_1-(C_1-\text{Load})\times m_2, \text{ and}$$

$$\text{Radius}=m_2\times\text{Load}+b_2-(C_2-\text{Pressure})\times m_1.$$

It is noted that the two equations listed above express radius as a function of both tire pressure and load based on the original two sets of tire data. In this illustration, step e) includes a second substep of combining the two curves to provide a more accurate expression of radius since this averages the two original sets of data. The combined equations become the following equation:

$$\text{Radius}=m_1\times(\text{Pressure}-c_2)+m_2\times(\text{Load}-c_1)+(b_1+b_2)/2.$$

In this illustration, $c_1=C_1/2$ and $c_2=C_2/2$, the radius (i.e., the rolling radius) is conventionally obtained from a measurement of the rotational speed of the tire taken in step d), and the pressure is conventionally obtained using a pressure sensor in step c). Since radius, $m_1$, pressure, $c_2$, $m_2$, $c_1$, $b_1$, and $b_2$ are known, the above equation is solved for Load in a third substep of step e). Other illustrations of determining the axle load on the tire from the measurements of steps c) and d) and from the first and second relationships of steps a) and b) are left to the artisan.

A second method of the invention is for determining the percent axle load of a first axle of a moving vehicle having first and second axles and includes steps a) through e). Step a) includes empirically determining a first relationship between the pressure of a test tire and the rolling radius of the test tire at a constant axle load on the test tire, wherein the pressure is measured by a pressure sensor, and wherein the rolling radius is determined from the measured rotational speed of the test tire. Step b) includes empirically determining a second relationship between the axle load on the test tire and the rolling radius of the test tire at a constant pressure of the test tire, wherein the axle load is a measured axle load, and wherein the rolling radius is determined from the measured rotational speed of the test tire. Step c) includes, after steps a) and b), taking a measurement of the pressure of a first tire on the first axle using a pressure sensor and taking a measurement of the pressure of a second tire on the second axle using a pressure sensor. Step d) includes, after steps a) and b), taking a measurement of the rotational speed of the first tire and taking a measurement of the rotational speed of the second tire. Step e) includes determining the percent axle load of the first axle from the measurements of steps c) and d) and from the first and second relationships of steps a) and b).

In one embodiment of the second method, steps c) through e) are performed by a computer onboard the vehicle. In one variation, step e) includes approximating the first relationship with a first linear equation, approximating the second relationship with a second linear equation, and determining the percent axle load on the first axle from the measurements of steps c) and d) and from the first and second linear equations. In one application, the second method also includes the step of controlling the vehicle based on the percent axle load determined in step e). In one implementation of the first and/or second method, the vehicle has only two axles (i.e., a front axle and a rear axle), and in one variation, each of the two axles has only one left side tire and only one right side tire. In the same or a different implementation, the test tire and the rotating tire (or the first and second tires) have substantially the same graphs of tire radius versus tire pressure at constant tire load and have the same graphs of tire radius versus tire load at constant pressure. In one variation, the test tire and the rotating tire (or the first and second tires) are the same make and model tire.

In one illustration of the second method, the combined equation from the second substep of step e) of the first illustration of the first method is written twice, once for the first axle (hereinafter referred to as the front axle) and once for the second axle (hereinafter referred to as the rear axle). Each axle typically has a different average tire pressure and load and subsequently has a different rolling radius. The front and rear axle equations are:

$$\text{Radius}_{frt} = m_1 \times (\text{Pressure}_{frt} - c_2) + m_2 \times (\text{Load}_{frt} - c_1) + (b_1 + b_2)/2, \text{ and}$$

$$\text{Radius}_{rear} = m_1 \times (\text{Pressure}_{rear} - c_2) + m_2 \times (\text{Load}_{rear} - c_1) + (b_1 + b_2)/2.$$

In these equations, $\text{Pressure}_{frt}$ is the average tire pressure for the front axle tires, etc. In this illustration, step e) relies on converting the radius term in the above equations to angular wheel speed. It is noted that $V = \omega \times r$, where V is vehicle speed, $\omega$ is the angular wheel speed, and r is the rolling radius. Thus, $\text{Radius}_{frt} = V/\omega_{frt}$ and $\text{Radius}_{rear} = V/\omega_{rear}$ so that $\text{Radius}_{frt}/\text{Radius}_{rear} = \omega_{rear}/\omega_{frt}$. Thus:

$$\frac{\text{Radius}_{frt}}{\text{Radius}_{rear}} =$$

$$\frac{m_1 \times (\text{Pressure}_{frt} - c_2) + m_2 \times (\text{Load}_{frt} - c_1) + (b_1 + b_2)/2}{m_1 \times (\text{Pressure}_{rear} - c_2) + m_2 \times (\text{Load}_{rear} - c_1) + (b_1 + b_2)/2}$$

and $$\frac{\omega_{rear}}{\omega_{frt}} = \frac{m_1 \times (\text{Pressure}_{frt} - c_2) + m_2 \times (\text{Load}_{frt} - c_1) + (b_1 + b_2)/2}{m_1 \times (\text{Pressure}_{rear} - c_2) + m_2 \times (\text{Load}_{rear} - c_1) + (b_1 + b_2)/2}$$

Figure 3:
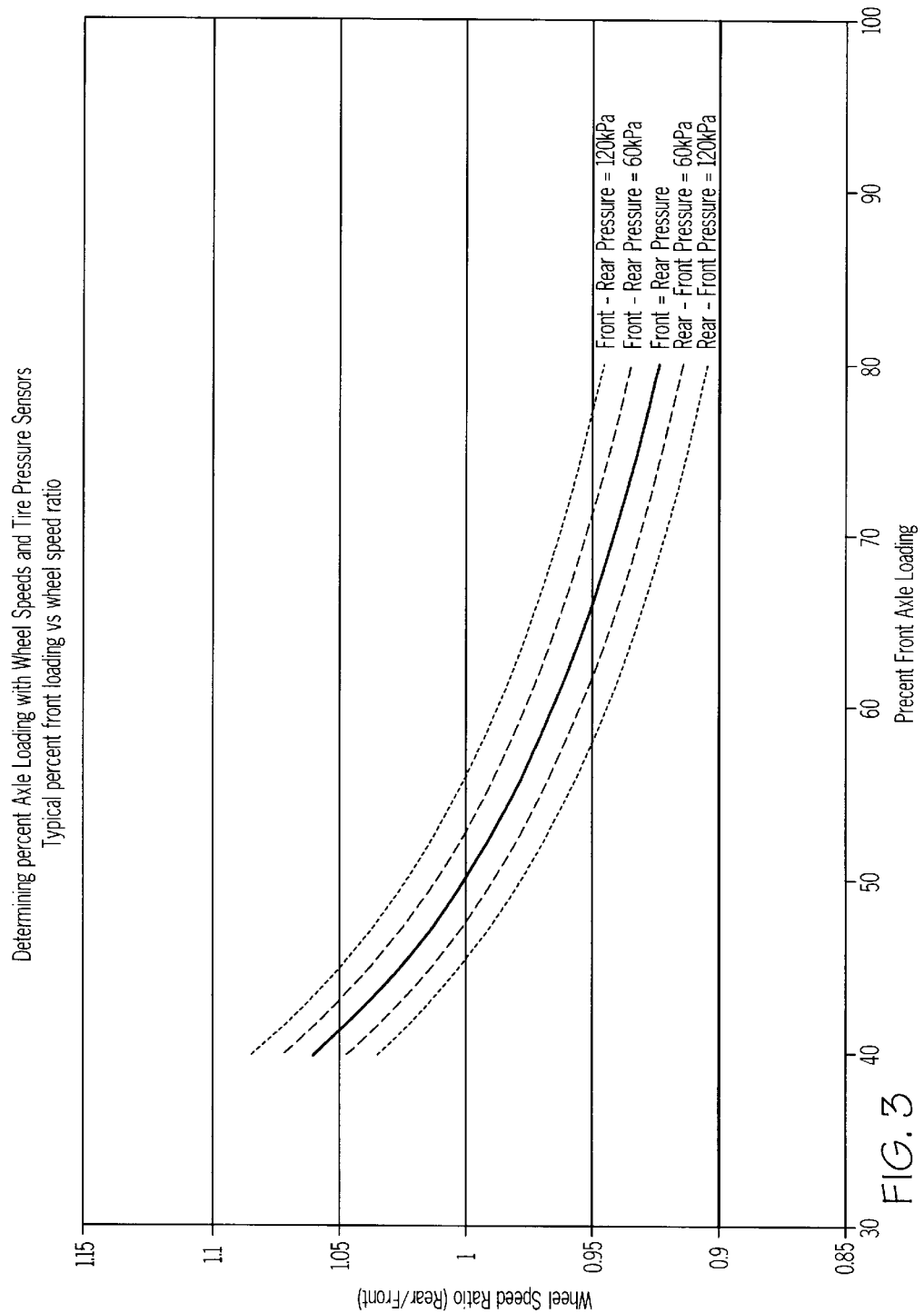
FIG. 3 is a graph of wheel speed ratio versus percent front axle loading.

In this final equation of $\omega_{rear}/\omega_{frt}$ it is noted that $m_1$, $m_2$, $b_1$, $b_2$, $c_1$, and $c_2$ are all known from the tire test results. Assuming values for tire pressure (equal front and rear) and assuming a wide range of front and rear loads, we can obtain a graphical relationship between percent front loading [loadfrt/(loadfrt+loadrear)] and wheel speed ratio [$\omega_{rear}/\omega_{frt}$] which is seen, in this illustration, as the solid line in FIG. 3. Assuming constant loading and variable tire pressures, the effect of differential tire pressures on the nominal curve can be determined by the artisan as illustrated in the dashed and dotted lines of FIG. 3. In one variation, instead of expressing the above equation in graphical terms, front percent loading is determined from a lookup table in which are found calculated wheel speed ratio, a percent front axle loading for equal front and rear pressure, and offsets based on tire pressure differential between front and rear average tire pressures. It is noted that percent axle load of the first (e.g., front) axle can be expressed as either a percent of the total first and second (e.g., front and rear) axle load as in FIG. 3, or a percent of the second (e.g., rear) axle load, as is within the skill level of the artisan. Other illustrations of the second method are left to the artisan.

An extended second method is also for determining the total first and second axle load on the vehicle and also includes the step of determining the total first and second axle load on the vehicle from the determined percent axle load on the first axle. In one application, the extended second method also is for controlling the vehicle and also includes the step of controlling the vehicle based on the determined total first and second axle loads.

Figure 4:
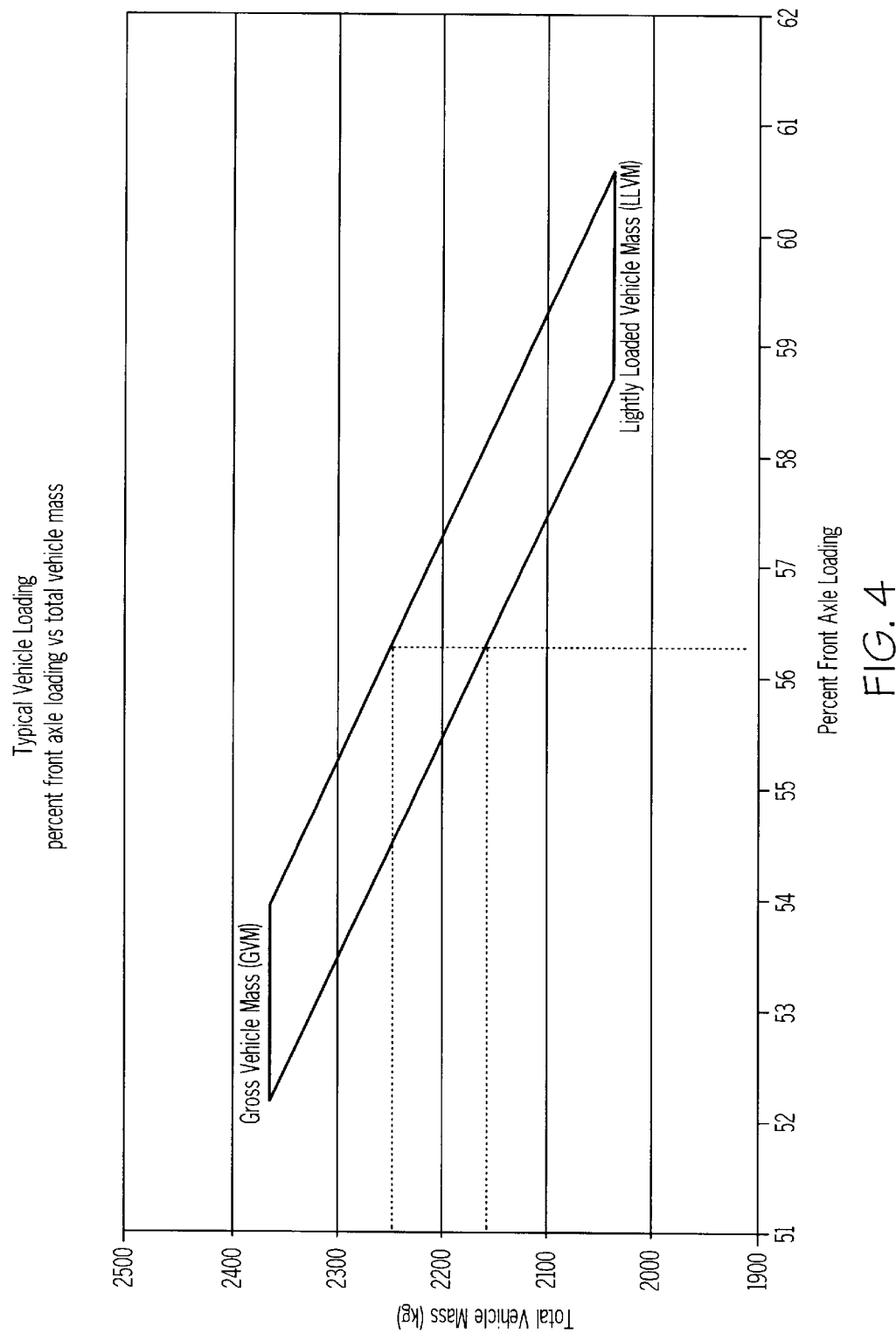
FIG. 4 is a graph of total vehicle mass versus percent front axle loading.

It is noted that for most vehicles there are a range of percent front loads possible at both gross vehicle mass (GVM) and lightly loaded vehicle mass (LLVM). In one illustration of the extended second method, from known loaded characteristics of the vehicle and from the percent front loading determined from FIG. 3 (or from an equivalent lookup table), the total vehicle weight (within some error bounds) can be determined, as illustrated in FIG. 4. Other illustrations of the extended second method are left to the artisan.

A third method is for determining the axle load on a rotating tire of a moving vehicle and includes steps a) through c). Step a) includes empirically determining a relationship between the axle load on the a tire and the rolling radius of the test tire at a constant pressure of the test tire, wherein the axle load is a measured axle load, and wherein the rolling radius is determined from the measured rotational speed of the test tire. Step b) includes, after step a), taking a measurement of the rotational speed of the rotating tire. Step c) includes determining the axle load on the rotating tire from the measurement of step b) and from the relationship of step a).

In one embodiment of the third method, steps b) and c) are performed by a computer onboard the vehicle. In one variation, step c) includes approximating the relationship with a linear equation and determining the axle load on the rotating tire from the measurement of step b) and from the linear equation. In one application, the third method also includes the step of controlling the vehicle based on the axle load determined in step c).

In one illustration of the third method, which is not as accurate under all conditions as the first illustration of the first method, the axle load is determined from the previous equation:

$$\text{Radius} = m_2 \times \text{Load} + b_2 \text{ (performed at constant pressure } C_2\text{)},$$

wherein $C_2$ is a predetermined pressure. Other illustrations of the third method are left to the artisan.

A fourth method of the invention is for determining the percent axle load of a first axle of a moving vehicle having first and second axles and includes steps a) through c). Step a) includes empirically determining a relationship between the axle load on a test tire and the rolling radius of the test tire at a constant pressure of the test tire, wherein the axle load is a measured axle load, and wherein the rolling radius is determined from the measured rotational speed of the test tire. Step b) includes, after step a), taking a measurement of the rotational speed of a first tire on the first axle and taking a measurement of a second tire on the second axle. Step c) includes determining the percent axle load on the first axle from the measurements of step b) and from the relationship of step a).

In one embodiment of the fourth method, steps b) and c) are performed by a computer onboard the vehicle. In one variation, step e) includes approximating the relationship with a linear equation and determining the percent axle load on the first axle from the measurements of step b) and from the linear equation. In one application, the fourth method also includes the step of controlling the vehicle based on the percent axle load determined in step c). In one implementation of the third and/or fourth method, the vehicle has only two axles (i.e., a front axle and a rear axle), and in one variation, each of the two axles has only one left side tire and only one right side tire. In the same or a different implementation, the test tire and the rotating tire (or the first and second tires) have substantially the same graphs of tire radius versus tire pressure at constant tire load and have the same graphs of tire radius versus tire load at constant pressure. In one variation, the test tire and the rotating tire (or the first and second tires) are the same make and model tire.

In one illustration of the fourth method, the equation of the second method for $\omega_{rear}/\omega_{frt}$, is modified to be:

$$\frac{\omega_{rear}}{\omega_{frt}} = \frac{m_2 \times Load_{frt} + b_2}{m_2 \times Load_{rear} + b_2}$$

Other illustrations of the fourth method are left to the artisan.

An extended fourth method is also for determining the total first and second axle load on the vehicle and also includes the step of determining the total first and second axle load on the vehicle from the determined percent axle load on the first axle. In one application, the extended fourth method also is for controlling the vehicle and also includes the step of controlling the vehicle based on the determined total first and second axle loads. Other illustrations of the extended fourth method are left to the artisan.

Several benefits and advantages are derived from one or more of the methods of the invention. Determining axle load from tire rotational speed measurements or from tire rotational speed and tire pressure measurements is less expensive than using a conventional and relatively-expensive vehicle ride height sensor located at a wheel. Having axle load information easily available allows such information to be used to control the vehicle as with conventional vehicle control systems employing, or adapted by using a method of the invention to employ, axle load inputs.

The foregoing description of several methods of the invention has been presented for purposes of illustration. It is not intended to be exhaustive or to limit the invention to the precise procedures disclosed, and obviously many modifications and variations are possible in light of the above teaching. It is intended that the scope of the invention be defined by the claims appended hereto.

What is claimed is:

1. A method for determining the axle load on a rotating tire of a moving vehicle comprising the steps of:
   a) empirically determining a first relationship between the pressure of a test tire and the rolling radius of the test tire at a constant axle load on the test tire, wherein the pressure is measured by a pressure sensor, and wherein the rolling radius is determined from the measured rotational speed of the test tire;
   b) empirically determining a second relationship between the axle load on the test tire and the rolling radius of the test tire at a constant pressure of the test tire, wherein the axle load is a measured axle load, and wherein the rolling radius is determined from the measured rotational speed of the test tire;
   c) after steps a) and b), taking a measurement of the pressure of the rotating tire using a pressure sensor;
   d) after steps a) and b), taking a measurement of the rotational speed of the rotating tire; and
   e) determining the axle load on the rotating tire from the measurements of steps c) and d) and from the first and second relationships of steps a) and b).

2. The method of claim 1, wherein steps c) through e) are performed by a computer onboard the vehicle.

3. The method of claim 1, wherein step e) includes approximating the first relationship with a first linear equation, approximating the second relationship with a second linear equation, and determining the axle load on the rotating tire from the measurements of steps c) and d) and from the first and second linear equations.

4. The method of claim 1, also for controlling the vehicle, wherein the method also includes the step of controlling the vehicle based on the axle load determined in step e).

5. A method for determining the percent axle load of a first axle of a moving vehicle having first and second axles comprising the steps of:
   a) empirically determining a first relationship between the pressure of a test tire and the rolling radius of the test tire at a constant axle load on the test tire, wherein the pressure is measured by a pressure sensor, and wherein the rolling radius is determined from the measured rotational speed of the test tire;
   b) empirically determining a second relationship between the axle load on the test tire and the rolling radius of the test tire at a constant pressure of the test tire, wherein the axle load is a measured axle load, and wherein the rolling radius is determined from the measured rotational speed of the test tire;
   c) after steps a) and b), taking a measurement of the pressure of a first tire on the first axle using a pressure sensor and taking a measurement of the pressure of a second tire on the second axle using a pressure sensor;
   d) after steps a) and b), taking a measurement of the rotational speed of the first tire and taking a measurement of the rotational speed of the second tire; and
   e) determining the percent axle load of the first axle from the measurements of steps c) and d) and from the first and second relationships of steps a) and b).

6. The method of claim 5, wherein steps c) through e) are performed by a computer onboard the vehicle.

7. The method of claim 5, wherein step e) includes approximating the first relationship with a first linear equation, approximating the second relationship with a second linear equation, and determining the percent axle load on the first axle from the measurements of steps c) and d) and from the first and second linear equations.

8. The method of claim 5, also for controlling the vehicle, wherein the method also includes the step of controlling the vehicle based on the percent axle load determined in step e).

9. The method of claim 5, wherein the method is also for determining the total first and second axle load on the vehicle, and wherein the method also includes the step of determining the total first and second axle load on the vehicle from the determined percent axle load on the first axle.

10. The method of claim 9, also for controlling the vehicle, wherein the method also includes the step of controlling the vehicle based on the determined total first and second axle loads.

11. A method for determining the axle load on a rotating tire of a moving vehicle comprising the steps of:
    a) empirically determining a relationship between the axle load on the test tire and the rolling radius of the test tire at a constant pressure of a test tire, wherein the axle load is a measured axle load, and wherein the rolling radius is determined from the measured rotational speed of the test tire;
    b) after step a), taking a measurement of the rotational speed of the rotating tire; and
    c) determining the axle load on the rotating tire from the measurement of step b) and from the relationship of step a).

12. The method of claim 11, wherein steps b) and c) are performed by a computer onboard the vehicle.

13. The method of claim 11, wherein step c) includes approximating the relationship with a linear equation and determining the axle load on the rotating tire from the measurement of step b) and from the linear equation.

14. The method of claim 11, also for controlling the vehicle, wherein the method also includes the step of controlling the vehicle based on the axle load determined in step c).

15. A method for determining the percent axle load of a first axle of a moving vehicle having first and second axles comprising the steps of:
   a) empirically determining a relationship between the axle load on a test tire and the rolling radius of the test tire at a constant pressure of the test tire, wherein the axle load is a measured axle load, and wherein the rolling radius is determined from the measured rotational speed of the test tire;
   b) after step a), taking a measurement of the rotational speed of a first tire on the first axle and taking a measurement of a second tire on the second axle; and
   c) determining the percent axle load on the first axle from the measurements of step b) and from the relationship of step a).

16. The method of claim 15, wherein steps b) and c) are performed by a computer onboard the vehicle.

17. The method of claim 15, wherein step c) includes approximating the relationship with a linear equation, and determining the percent axle load on the first axle from the measurements of step b) and from the linear equation.

18. The method of claim 15, also for controlling the vehicle, wherein the method also includes the step of controlling the vehicle based on the percent axle load determined in step c).

19. The method of claim 15, wherein the method is also for determining the total first and second axle load on the vehicle, and wherein the method also includes the step of determining the total first and second axle load on the vehicle from the determined percent axle load on the first axle.

20. The method of claim 19, also for controlling the vehicle, wherein the method also includes the step of controlling the vehicle based on the determined total first and second axle loads.

* * * * *